United States Patent

Tanaka et al.

Patent Number: 5,097,808
Date of Patent: Mar. 24, 1992

[54] ENGINE CONTROL SYSTEM FOR INTERNAL COMBUSTION ENGINE

[75] Inventors: Kazuo Tanaka; Hideo Shiraishi; Masanao Okano, all of Hiroshima, Japan

[73] Assignee: Mazda Motor Corporation, Hiroshima, Japan

[21] Appl. No.: 578,657

[22] Filed: Sep. 7, 1990

[30] Foreign Application Priority Data

Sep. 7, 1989 [JP] Japan .................. 1-230498

[51] Int. Cl.$^5$ .................. F02D 41/16; F02P 5/145
[52] U.S. Cl. .................. 123/339; 123/418
[58] Field of Search .................. 123/339, 418, 478; 180/69.3

[56] References Cited

U.S. PATENT DOCUMENTS

| | | | |
|---|---|---|---|
| 4,520,777 | 6/1985 | Hatori et al. | 123/339 |
| 4,545,449 | 10/1985 | Fujiwara | 123/339 X |
| 4,724,810 | 2/1988 | Poirer et al. | 123/339 |

FOREIGN PATENT DOCUMENTS 291739 12/1986 Japan .................. 123/339

*Primary Examiner*—Tony M. Argenbright
*Attorney, Agent, or Firm*—Fleit, Jacobson, Cohn, Price, Holman & Stern

[57] ABSTRACT

An engine control system for an engine of a vehicle provided with a power steering system having a power steering pump has an engine torque controller for varying output torque of the engine according to engine operating conditions. The engine torque controller is forced to increasingly vary the engine torque when a hydraulic pressure sensor, located just behind, or after, the power steering pump, detects a hydraulic pressure higher than a predetermined hydraulic pressure. The varying action of the engine torque controller is suspended while a temperature sensor, located just before or after the hydraulic pressure sensor, detects a temperature lower than a predetermined temperature.

10 Claims, 5 Drawing Sheets

ENGINE CONTROL SYSTEM FOR INTERNAL COMBUSTION ENGINE

FIELD OF THE INVENTION

The present invention relates to an engine control system for an automotive vehicle, and, more particularly, to an engine control system for an automotive vehicle with a power steering system which forces the engine to increase its output torque when the power steering system is in use.

BACKGROUND OF THE INVENTION

An engine control system of this kind has oil pressure sensing means for sensing the hydraulic pressure of the power steering system. The engine control system, when detecting a hydraulic pressure higher than a predetermined pressure, forces the engine to increase its speed of rotation so as to prevent the engine from stopping when the power steering system is in use. Such an engine control system is known from, for instance, Japanese Unexamined Patent Publication No. 52-53328.

Since oil utilized by the power steering system increases in viscosity while the engine is cold, and, therefore, the volume of oil flowing in oil passages is undesirably reduced, oil pressure can be detected as being high as the power steering is working. In this case, the engine controlled by the conventional engine control system is, when required to increase output power, unnecessarily forced to generate an excess output torque. This results in increased consumption of fuel and a deterioration in emission control.

SUMMARY OF THE INVENTION

The primary object of the present invention is to provide an engine control system for an internal combustion engine having a hydraulic pressure operated power steering system, which can properly control output torque of the engine for any engine operating condition.

This primary object of the present invention is achieved by providing a particular engine control system for an internal combustion engine of a vehicle including a hydraulic pressure operated power steering system. The engine control system has a power steering pump, driven by the engine, which provides hydraulic pressure to bolster, or strengthen, the normal torque developed by a steering gearbox, so as to make steering wheel manipulation easy and, at the same time, offer some resistance so that the driver can retain some road feel. The engine control system comprises engine torque control means which increasingly or decreasingly varies output torque of the engine, according to engine operating conditions. The engine control system includes a hydraulic pressure sensor, located just behind the power steering pump, for detecting a hydraulic pressure of a fluid discharged by the power steering pump, and a temperature sensor, located just in front of or behind the hydraulic pressure sensor, for detecting a temperature of the fluid. The engine torque control means is forced to increasingly vary the engine torque when the hydraulic pressure sensor detects a hydraulic pressure higher than a predetermined hydraulic pressure. Action of the engine torque control means is, however, suspended while the temperature sensor detects a temperature lower than a predetermined temperature.

Increasingly or decreasingly varying the output torque of the engine is performed, in the particular embodiment described herein, by varying the amount of fuel to be delivered into the engine according to engine operating conditions.

BRIEF DESCRIPTION OF THE DRAWINGS

The above and other objects and features of the present invention will be apparent from the following description of a preferred embodiment thereof when considered in conjunction with the appended drawings, in which.

DESCRIPTION OF THE PREFERRED EMBODIMENT

Figure 1:
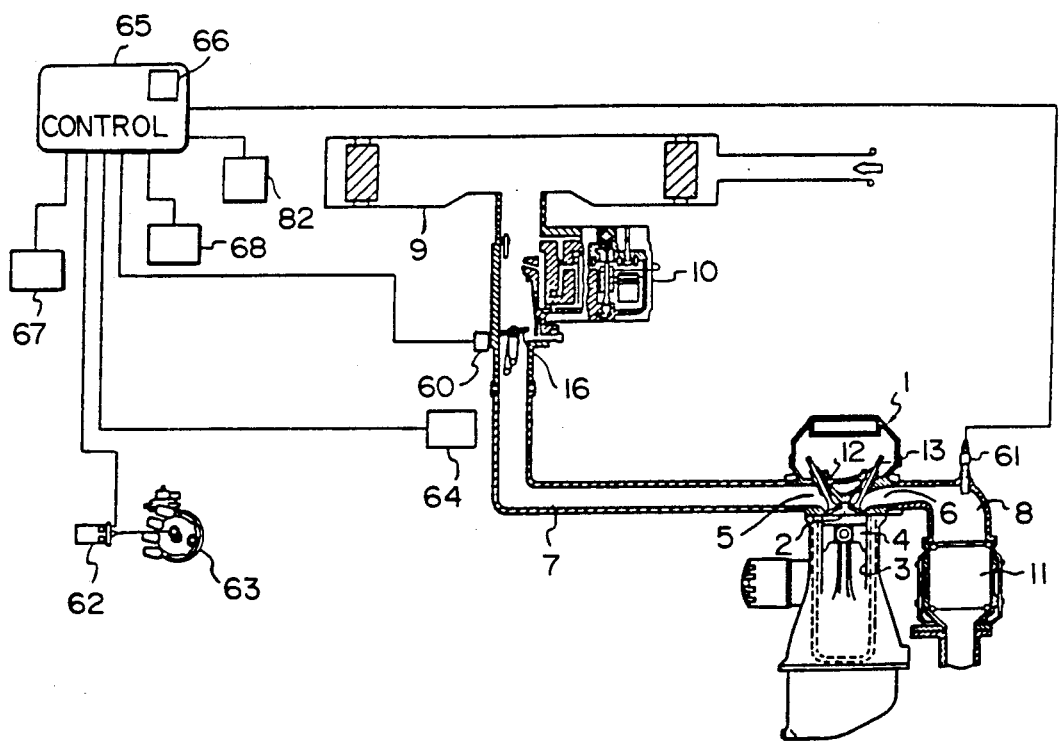
FIG. 1 is a schematic illustration showing an engine with an engine control system in accordance with a preferred embodiment of the present invention.

Referring to the drawings in detail, particularly to FIG. 1, an engine cooperating with an engine control system in accordance with a preferred embodiment of the present invention is shown. An engine body 1 has a combustion chamber 2 formed in a cylinder 3 in which a piston 4 slides. The combustion chamber 2 is varied in volume by the piston 4. The cylinder 3 is provided with an intake port 5 having an opening which extends toward one side of the engine body 1. Further, the cylinder 3 is provided with an exhaust port 6 having an opening which extends toward the other side of the engine body 1. The intake port 5 and the exhaust port 6 open into the combustion chamber 2, and are opened and shut at a predetermined timing by an intake valve 12 and an exhaust valve 13, respectively.

Intake air is introduced into the cylinder 3 through an intake passage 7 having an air cleaner 9 at one end thereof and a two-stage, two-valve type carburetor 10, which will be described in detail later in conjunction with FIG. 2, approximately halfway between the engine body 1 and the air cleaner 9. The intake passage 7 is provided with a throttle valve 16 The degree to which the throttle valve is opened is detected by a throttle valve sensor 60.

Burned gasses leave the engine 1 through an exhaust passage 8 having a catalytic converter 11. Because an air-fuel control device of carburetor 10 is sensitive to the oxygen content of the exhaust, a closed loop fuel system or feedback fuel control system is utilized to determine a proper air-fuel ratio and then constantly monitor the exhaust to verify the accuracy of the mixture setting. For this purpose, the exhaust passage 8 is provided, before the catalytic converter 11, with an exhaust sensor or oxygen sensor 61 for detecting levels of oxygen.

Figure 2:
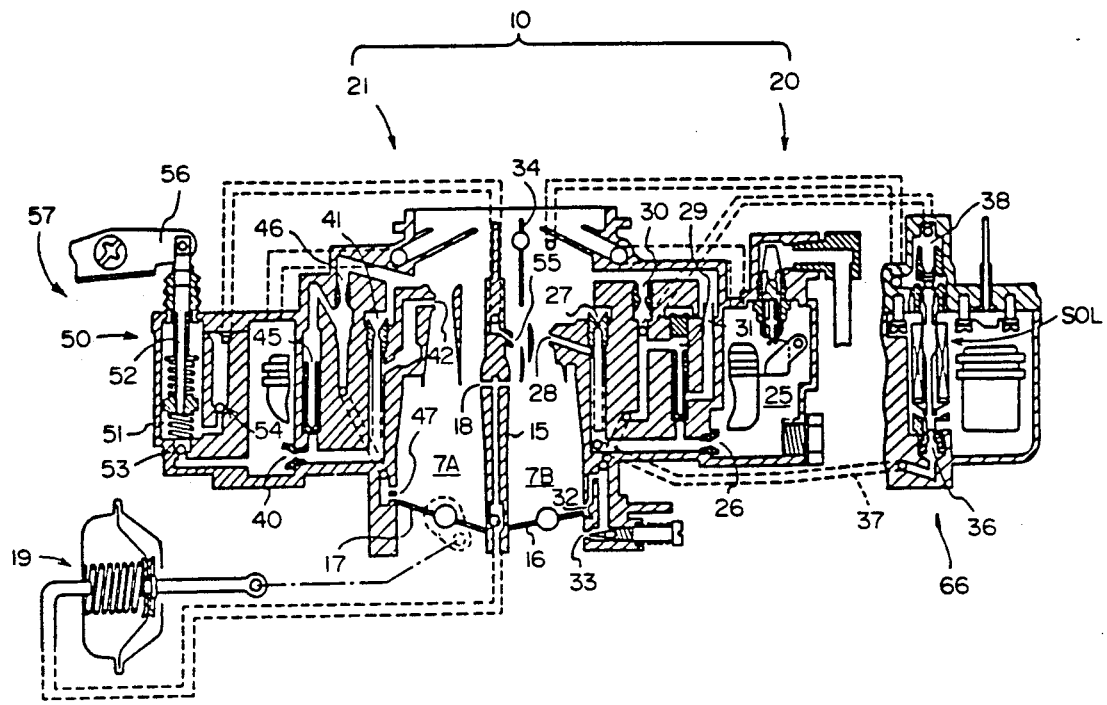
FIG. 2 is a cross-sectional view of a carburetor installed in the engine shown in FIG. 1.

Referring to FIG. 2, the two-stage, two-valve type carburetor 10 has a partition wall 15 dividing the intake passage 7 into two passages, namely a primary intake passage 7A and a secondary intake passage 7B, providing for venturies. Throttle valves 16 and 17, which are hereinafter referred to as a primary and secondary throttle valves, respectively, are disposed in the primary and secondary intake passages 7A and 7B, respectively. The secondary throttle valve 17 is designed to operate when the primary throttle valve 16 has opened at an angle larger than a predetermined angle, e.g., an angle of about 48 degrees. When the secondary throttle valve 17 is allowed to operate, it is opened and closed by a spring loaded diaphragm-type actuator 19, which acts in response to negative pressure produced at a port 18 opening into venturi throats of the primary and secondary intake passages 7A and 7B. As the pressure at the port 18 becomes lower, the open angle of secondary throttle valve 17 becomes larger.

The carburetor 10 has primary and secondary carburetor systems 20 and 21 for discharging fuel into the primary and secondary intake passages 7B and 7A, respectively. The primary carburetor system 20 of the carburetor 10, acting as a main carburetor system, has a primary main jet 26 facing a float chamber 25. The primary carburetor system 20 further has a primary main discharge nozzle 28 for discharging the fuel into the venturi of the primary intake passage 7A. Drops of fuel from the primary main jet 26 are rather large and tend to stick to the primary main discharge nozzle 28. For making the drops exit readily from the primary main discharge nozzle and be quite small, a primary air bleeder 27 is provided between the primary main jet 26 and the primary main discharge nozzle 28. The primary carburetor system 20 is provided with a primary low speed jet 29, for low speed or idle operation, which is in communication with a low speed port 32 and an idle port 33 through an additional passage with first and second low speed air bleeders 30 and 31. A choke valve 34, used as an ignition valve, is located above the top of the venturi of the primary intake passage 7A.

The primary carburetor system 20 is further provided with a feedback fuel control system 35 having an auxiliary jet 36, in communication with the float chamber 25, which is connected to the primary air bleeder 27 by an passage 37. The auxiliary jet 36 is provided with a feedback fuel control solenoid SOL for adjusting the area of opening to the float chamber 25. The feedback fuel control solenoid SOL is provided, at one end thereof, remote from the auxiliary jet 36, with an auxiliary low speed air bleeder 38 in communication with the first low speed air bleeder 30. The feedback fuel control solenoid SOL adjusts the area of passage between the float chamber 25 and the auxiliary jet 36 to correctively vary the amount of fuel so as to deliver a correct air-fuel ratio for any given engine demand.

The secondary carburetor system 21 of the carburetor 10, acting as a secondary carburetor system, has a secondary main jet 40 in communication with the float chamber 25. The secondary carburetor system 21 further has a secondary main discharging nozzle 42, receiving the fuel through a secondary air bleeder 41, for discharging quite small drops of the fuel into the venturi of the secondary intake passage 7B. The secondary carburetor system 21 is provided with a secondary low speed jet 45, in communication with the secondary main jet 40, which is connected to a step port 47 through a secondary low speed air bleeder 46. The step port 47, opening into the secondary intake passage 7B near the throttle valve 17, discharges the fuel during a transition of fuel discharge between the fuel discharges from the primary and secondary main discharge nozzles 27 and 42.

The carburetor 10 is further provided with an acceleration fuel control system 57 having an acceleration pump 50 for increasingly discharging fuel during acceleration. The pump 50 has a fuel chamber 51, in which a spring loaded plunger 52 can slide. The fuel chamber 51 is connected to the float chamber 25 through an inlet valve 53, including, for instance, a one-way valve, and to a pump injector nozzle 55, opening near the venturi of the primary intake passage 7A through an outlet valve 54 consisting of, for instance, a one-way valve. The plunger 52 is pivotally coupled to an pump arm 56 linked to the primary throttle valve 16. The accelerator fuel control system 57 thus constructed forces the plunger 52 to move up and down so as to send fuel in the fuel chamber 51 through the outlet valve 54 and discharge fuel increasingly into the primary intake passage 7A from a pump injector nozzle 55 during engine acceleration.

Figure 4:
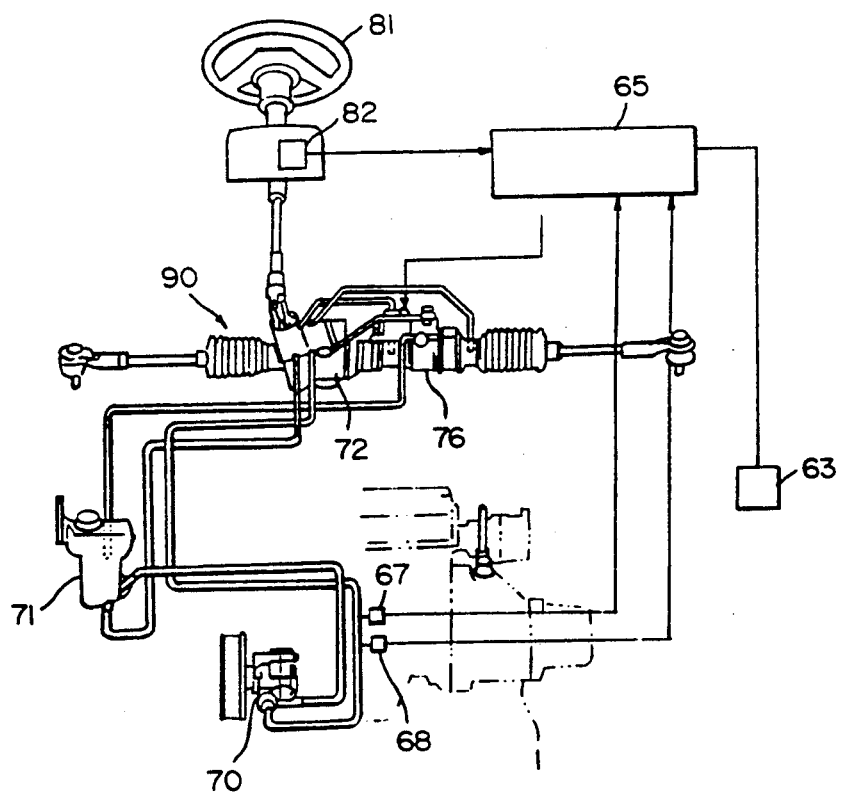
FIG. 4 is a schematic illustration showing a power steering system.
Figure 5:
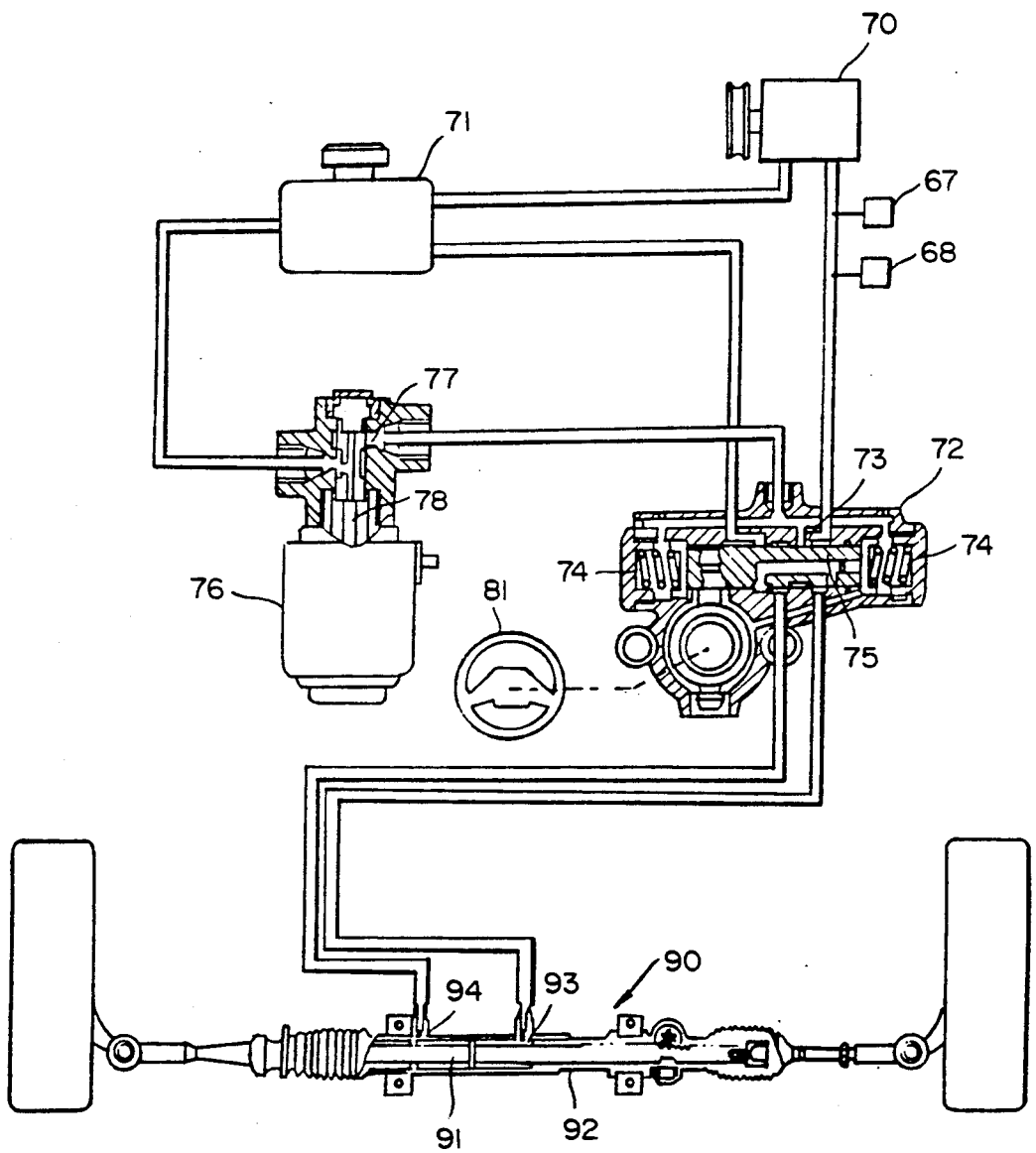
FIG. 5 is a diagram illustrating a hydraulic oil circuit.

Referring to FIGS. 4 and 5, a typical power steering system is shown. The power steering system, which itself is well known in operation and structure, comprises a steering wheel turning control valve 72 and a control valve 76 with a variable orifice 77. Pressure developed in reaction chambers 74 of the steering wheel turning control valve 72 is regulated by changing the size of opening of the variable orifice 77 of the control valve 76 in response to changing vehicle speeds. Changing the size of opening of the variable orifice 77 is carried out by up or down movement of a solenoid operated control rod 78 caused by a signal, representative of vehicle speed detected by a vehicle speed sensor 82, from the controller 65.

While the vehicle is standing or running in a straight direction at a low speed, hydraulic oil, discharged from a vane pump 70, returns into a vane pump tank 71, passes through the steering wheel turning control valve 72, so that a hydraulic cylinder 91 of a front wheel driving axle assembly 90 is not actuated. On the other hand, the hydraulic oil, passed through a fixed orifice 73 of the steering wheel turning control valve 72, flows into the control valve 76 and passes through the variable orifice 77 of the control valve 76 which has been opened to a large degree, and then returns into the vane pump tank 71. Accordingly, hydraulic pressure in the reaction chambers 74 of the steering wheel turning control valve 72 does not increase.

When turning the steering wheel 81 left or counterclockwise, or right or clockwise, while the vehicle is standing or is running at a low speed, the hydraulic oil discharged from the vane pump 70 is directed toward one of the left and right cylinder chambers 93 and 94 of the hydraulic cylinder 91 of the front wheel driving axle assembly 90 by the action of a sprocket 75, coupled to the steering wheel 81, of the steering wheel turning control valve 72, so as to move a hydraulic piston 92 in the hydraulic cylinder 91 in one of the left and right directions. Simultaneously, the hydraulic oil, passes through the fixed orifice 73 of the steering wheel turning control valve 72, flows into the control valve 76 and passes through the variable orifice 77 of the control valve 80 which has also been opened to a large degree, and then returns into the vane pump tank 71. Accordingly, hydraulic pressure in the reaction chambers 74 of the steering wheel turning control valve 72 does not increase. As a result, the sprocket 75 can move to the right, so as to reduce the effort required to turn the steering wheel.

While the vehicle is running in a straight direction at a high speed, the hydraulic oil discharged from the vane pump 70 returns into the vane pump tank 71, passing through the steering wheel turning control valve 72, so that the hydraulic cylinder 91 of the front wheel driving axle assembly 90 is not actuated. However, at the same time, since the variable orifice 77 of the control valve 76 has been opened only to a small degree, the hydraulic oil, flowing into the control valve 76 and passing through the variable orifice 77 of the control valve 76, generates a high hydraulic pressure in the reaction chambers 74 of the steering wheel turning control valve 72. As a result, the sprocket 75 becomes hard to move, so that the steering wheel 81 is stably maintained in position.

On the other hand, when the steering wheel 81 is turned left or right while the vehicle is running at a high speed, the hydraulic oil discharged from the vane pump 70 is directed toward one of the left and right cylinder chambers 93 and 94 of the hydraulic cylinder 91 of the front wheel driving axle assembly 90 by the action of the sprocket 75 of the steering wheel turning control valve 72, so as to move a hydraulic piston 92 in the hydraulic cylinder 91 in the same direction as the steering wheel. At the same time, however, since the variable orifice 77 of the control valve 80 is opened to a smaller degree than when the vehicle is running at a high speed in a straight direction, the hydraulic oil flowing into the control valve 76 and passing through the variable orifice 77 of the control valve 76, generates a higher hydraulic pressure in the reaction chambers 74 of the steering wheel turning control valve 72. As a result, the spool valve 75, and accordingly the steering wheel 81, becomes hard to move or turn, so that the driver can retain some "road feel", i.e., the feeling imparted to the steering wheel by the wheels of the vehicle in motion.

To control the engine 1, an engine controller 65, comprising a microcomputer, constantly monitors engine operating conditions, such as engine speed, engine load or throttle opening, exhaust gas oxygen content, intake pressure, power steering oil coolant temperature, etc. In order to detect these engine operating conditions and provide the engine controller 65 with signals representative of the engine operating conditions, there are provided the throttle valve sensor 60, the exhaust or oxygen sensor 61, a speed sensor which includes a distributor 63 connected to an ignition coil 62, a negative pressure sensor 64, and a temperature sensor 67 for detecting the temperature of a coolant for the power steering oil, all of these sensors being of well known types.

The controller 65 determines the proper air-fuel ratio in a closed loop fuel system or feedback fuel control system during normal engine operation after warming up of the engine 1. This is because the carburetor 10 is sensitive to the oxygen content of the exhaust. To perform feedback fuel control, the controller 65 includes an air-fuel ratio control unit 66 for calculating a duty ratio at which the feedback fuel control solenoid SOL of the feedback fuel control system 35 operates to provide a basic control value so as to deliver a target or correct air-fuel ratio, at least into the combustion chamber 2, for a present engine demand. That is, assuming a target air-fuel ratio be 14.7, which is the value necessary to maintain a "stoichiometric" air-fuel mixture, and an actual air-fuel mixture passing through the carburetor 10 to have an air-fuel ratio of 16, the control unit 66 first calculates the difference between the target and actual air-fuel ratios. Then, after correcting the basic control value with the difference (which is 1.3 in this case), as a correcting feedback value, the control unit adjusts the duty rate, based on the corrected basic control value, so as to deliver and maintain an air-fuel mixture having a desired or ideal ratio, i.e., the target air-fuel ratio of 14.7, into the carburetor 10.

Figure 3:
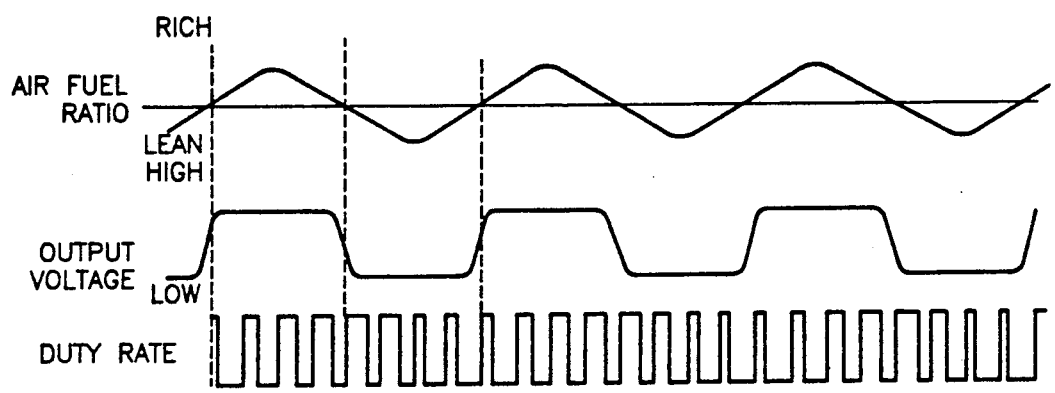
FIG. 3 is a diagram illustrating the duty rate, at which a fuel control solenoid valve is operated, according to output voltage from an oxygen sensor.

Because the oxygen sensor 61 typically has characteristics that may sharply change its output voltage at the target air-fuel ratio necessary to maintain a "stoichiometric" air-fuel mixture, the control unit 66 is adapted and designed to vary the duty rate according to output voltage from the oxygen sensor 61, as is shown in FIG. 3, and thereby maintain air-fuel ratios close to the ideal air-fuel ratio. It should be noted that the feedback fuel control is suspended while steering wheel turning effort is made.

The controller 65 also constantly monitors power steering system operating conditions, such as oil pressure and oil temperature. In order to detect these power steering system operating conditions and provide the engine controller 65 with signals representative of the engine operating conditions, an oil pressure sensor 67 and an oil temperature sensor 68 are provided for detecting a predetermined critical oil pressure and a predetermined critical oil temperature, respectively. The critical oil temperature may, for instance, be 35 degrees Centigrade. Both the oil pressure and the oil temperature sensors are disposed in an oil passage between the vane pump 70 and the steering wheel turning control valve 72. The oil pressure sensor 67 may be of an known type of switch which is adapted to turn on when it detects a hydraulic oil pressure higher than the critical pressure to provide a signal and, otherwise, adapted to be kept turned off. The controller 65, when receiving a signal from the oil pressure sensor 67, controls the feedback solenoid SOL so as to increase fuel delivery so that the engine compensates and increases its output power. However, if the oil temperature sensor 68 detects that a temperature of the hydraulic oil is lower than the critical temperature, the engine controller 65 controls the feedback solenoid SOL so as to suspend the increase of fuel delivery, even though there is a demand for increasing fuel delivery according to the operation of the steering wheel. Therefore, before the engine has been warmed up, increased fuel delivery as a result of misjudging that the power steering system is under operation is avoided.

Figure 6:
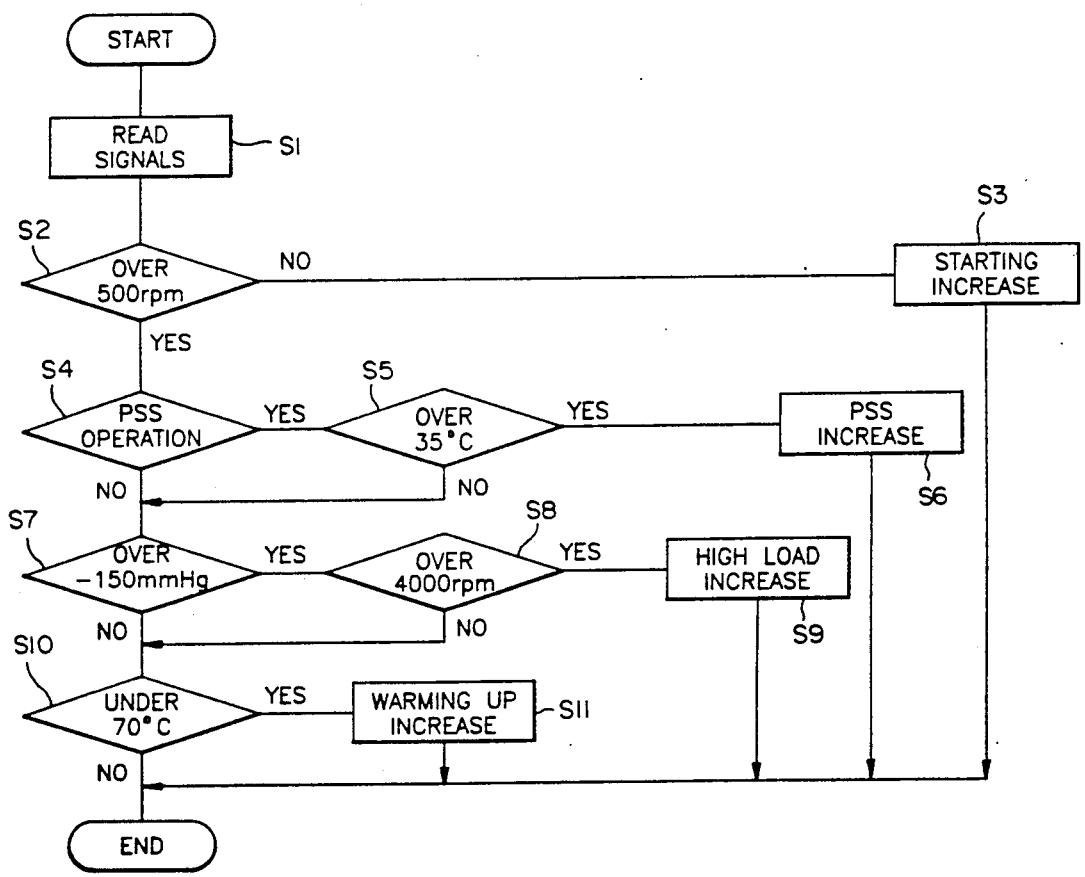
FIG. 6 is a flow chart illustrating a fuel increasing control routine.

The operation of the engine control system depicted in FIG. 1 is best understood by reviewing FIG. 6, which is a flow chart illustrating a fuel increasing control routine for the microcomputer of the controller 65. Programming a computer is a skill well understood in the art. The following description is written to enable a programmer, having ordinary skill in the art, to prepare an appropriate program for the microcomputer. The particular details of any such program would, of course, depend upon the architecture of the particular microcomputer selected.

Referring to FIG. 6, the first step S1 is to read various signals, representative of engine speed, hydraulic oil temperature, the temperature of hydraulic oil, and the intake negative pressure, in order to make various decisions. A first decision is made at step S2 to judge whether the rotational speed of the engine is higher that a critical speed, for instance 500 rpm. If the answer to the decision is no, this indicates that the engine has been just fired; the controller 65, after causing the feedback fuel control solenoid SOL, at step S3, in order to effect starting fuel increase (starting increase) control, then ends the fuel increasing control routine.

On the other hand, if the answer to the decision regarding the rotational speed of engine is yes, a decision is made at step S4 as to whether the power steering system (PSS) is in operation. This decision is made based on the existence of a signal from by the oil pressure sensor 78. If the answer to the decision is yes, then a further decision is made, at step S5, regarding the temperature of the hydraulic oil, in order to judge whether the yes decision at step S4 was correctly made. If the answer is yes, that is, the temperature of the hydraulic oil is higher than 35 degrees, it is decided that the yes decision at step S4 is correct, Then, after effecting a fuel increase control in using the power steering system (PSS increase), at step S6, in order to compensate the output power of the engine, the controller 65 ends the fuel increasing control routine.

However, if the answer to either one of the decisions at steps S4 and S5 is no, decisions are made at steps S7 and S8 as to whether the intake negative pressure is over −150 mmHg., which is created when the throttle valve is fully opened, and whether the rotational speed of the engine is higher than a critical speed, for instance 4000 rpm, respectively. If the answers to both of the decisions are yes, then, the controller 65, when judging that the engine is actually operated at a high engine load, effects high load fuel increase control (high load increase), at step S9, in order to make the engine to response to the high engine load and, thereafter, ends the fuel increasing control routine.

On the other hand, if the answer to at least one of the decisions at steps S7 and S8 is no, a final decision is made at step S10 as to whether the temperature of the hydraulic oil is higher than an upper critical temperature, for instance, 70 degrees Centigrade. If the answer to the decision at step S10 is yes, this indicates that the engine is warming up. The controller 65 then effects warming up fuel increase control, at step S11, in order to make the engine respond to the high engine load during warming u and, thereafter, ends the fuel increasing control routine. If the answer to the decision at step S10 is no, the controller 65 immediately ends the fuel increasing control routine.

Figure 7:
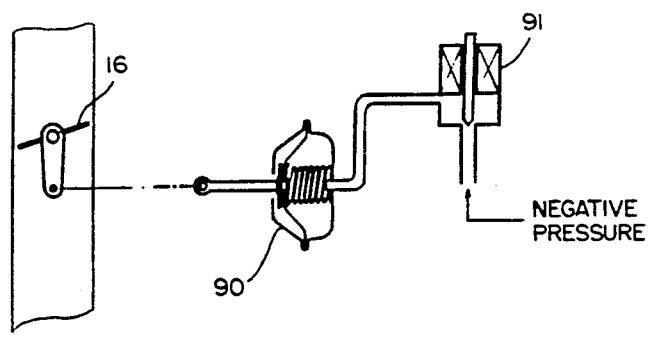
FIG. 7 is a schematic illustration of an engine control system in which feedback fuel control is performed by controlling the throttle valve.

Feedback fuel control may be performed by controlling the throttle valve 16, in place of using the feedback solenoid SOL. That is, as shown in FIG. 7, the throttle 16 is coupled to a servo diaphragm 90, into which negative pressure is introduced. The negative pressure is regulated by a solenoid valve 91 controlled by the controller 65 so as to increasingly or decreasingly vary an idle speed of rotation of the engine, according to engine operating conditions, thereby varying the output torque of the engine.

It is to be noted that the temperature of hydraulic oil, although being directly detected by the oil temperature sensor 79 in the embodiment described above, may be substituted for by the temperature of water for cooling the hydraulic oil. Furthermore, increasing the output torque of the engine may be effected by advancing an ignition timing.

It is further to be understood that although the invention has been described in detail with respect to a preferred embodiment, nevertheless, various other embodiments and variants are possible which are within the spirit and scope of the invention, and such are intended to be covered by the following claims.

What is claimed is:

1. An engine control system for an internal combustion engine of a vehicle provided with a hydraulic pressure operated power steering system having a power steering pump driven by said engine, comprising:
   engine torque control means for increasingly or decreasingly varying output torque of said engine according to engine operating conditions,
   a hydraulic pressure sensor for detecting a hydraulic pressure of a fluid discharged by said power steering pump;
   a temperature sensor for detecting a temperature of said fluid; and
   control means for forcing said engine torque control means to increasingly vary said output torque when said hydraulic pressure sensor detects hydraulic pressure higher than a predetermined hydraulic pressure and suspending variation of said output torque by said torque control means while said temperature sensor detects a temperature lower than a predetermined temperature.

2. An engine control system as defined in claim 1, wherein said engine torque control means increasingly or decreasingly varies the amount of fuel to be delivered into said engine according to engine operating conditions so as to vary said output torque.

3. An engine control system as defined in claim 2, wherein said engine torque control means varies said amount of fuel so as to maintain a predetermined air-fuel ratio.

4. An engine control system as defined in claim 1, wherein said engine torque control means maintains an idle speed of rotation of said engine and increasingly or decreasingly varies said idle speed of rotation according to engine operating conditions so as to vary said output torque.

5. An engine control system as defined in claim 1, wherein said engine torque control means advances or retards firing timings of cylinders of said engine according t engine operating conditions so as to vary said output torque.

6. An engine control system as defined in claim 1, wherein said hydraulic pressure sensor is located near an outlet of said power steering pump.

7. An engine control system as defined in claim 6, wherein said temperature sensor is located near said hydraulic pressure sensor.

8. An engine control system as defined in claim 1, wherein said control means is forced to be ineffective until said engine reaches a predetermined speed of rotation.

9. An engine control system as defined in claim 8, wherein said predetermined speed of rotation is approximately 500 rpm.

10. An engine control system as defined in claim 1, wherein said predetermined temperature is approximately 35 degrees Centigrade.

* * * * *